US009294235B2

(12) United States Patent
Zhang et al.

(10) Patent No.: US 9,294,235 B2
(45) Date of Patent: Mar. 22, 2016

(54) METHODS AND APPARATUSES FOR USER EQUIPMENT-BASED ENHANCEMENTS OF RADIO LINK CONTROL FOR MULTI-POINT WIRELESS TRANSMISSION

(75) Inventors: Danlu Zhang, San Diego, CA (US); Weiyan Ge, San Diego, CA (US); Rohit Kapoor, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 13/429,927

(22) Filed: Mar. 26, 2012

(65) Prior Publication Data

US 2012/0314648 A1 Dec. 13, 2012

Related U.S. Application Data

(60) Provisional application No. 61/494,328, filed on Jun. 7, 2011.

(51) Int. Cl.
*H04W 4/00* (2009.01)
*H04L 1/18* (2006.01)
*H04L 1/00* (2006.01)

(52) U.S. Cl.
CPC ....... *H04L 1/1848* (2013.01); *H04L 2001/0092* (2013.01)

(58) Field of Classification Search
USPC .................. 370/328, 312, 394, 412
See application file for complete search history.

(56) References Cited

U.S. PATENT DOCUMENTS

| 7,031,904 | B1 * | 4/2006 | Wilson | H04L 67/1097 370/338 |
| 7,236,494 | B2 * | 6/2007 | Mallory | 370/394 |
| 7,443,797 | B2 * | 10/2008 | Cheung et al. | 370/236 |
| 7,590,064 | B1 * | 9/2009 | Zhang | H04B 7/155 370/235 |

(Continued)

FOREIGN PATENT DOCUMENTS

| JP | 2013543706 | 12/2013 |
| WO | 2005112328 A2 | 11/2005 |
| WO | 2012044945 A1 | 4/2012 |

OTHER PUBLICATIONS

International Search Report and Written Opinion—PCT/US2012/041405, International Search Authority—European Patent Office, Jul. 30, 2012.
QUALCOMM Incorporated,"Further details and benefits of deploying DC-HSDPA UEs in Single Frequency Networks," R1-104738, 3GPP TSG RAN WG1 Meeting #62, Madrid, Spain, Aug. 23-27, 2010.

(Continued)

*Primary Examiner* — Ian N Moore
*Assistant Examiner* — Phong La
(74) *Attorney, Agent, or Firm* — Darren M. Simon

(57) ABSTRACT

In aspects of the present disclosure, a user equipment receives inter-NodeB multi-point transmissions, and a multipoint aggregation component detects a gap in the sequence numbers, delays transmitting a not acknowledged signal (NAK) by starting a NAK delay timer, and transmits, by a transceiver, NAK for the gap in sequence numbers in response to the NAK delay timer expiring and detecting that the gap has not been filled during the delaying. If the Medium Access Control (MAC) entity as the respective NodeB identifies itself to the Radio Link Control (RLC), out-of-order delivery (skew) can eventually be distinguished from genuine data loss before the NAK delay timer expires based upon tracking the highest sequence numbers received. Adaptive NAK delay timer can be performed by monitoring skew duration.

13 Claims, 10 Drawing Sheets

(56) References Cited

U.S. PATENT DOCUMENTS

| | | | |
|---|---|---|---|
| 7,876,677 B2* | 1/2011 | Cheshire | 370/230.1 |
| 8,295,779 B2* | 10/2012 | Cave et al. | 455/69 |
| 8,358,614 B2* | 1/2013 | Pani et al. | 370/328 |
| 8,553,698 B2* | 10/2013 | Wiemann et al. | 370/394 |
| 2003/0227875 A1* | 12/2003 | Wei et al. | 370/252 |
| 2005/0188146 A1* | 8/2005 | Teo | 711/5 |
| 2005/0270996 A1* | 12/2005 | Yi et al. | 370/312 |
| 2008/0225765 A1* | 9/2008 | Marinier et al. | 370/310 |
| 2008/0291937 A1* | 11/2008 | Cheshire | 370/429 |
| 2009/0086710 A1* | 4/2009 | Ho | 370/349 |
| 2009/0213729 A1* | 8/2009 | Zhang et al. | 370/216 |
| 2010/0034148 A1 | 2/2010 | Zhang et al. | |
| 2011/0038376 A1* | 2/2011 | Wiemann et al. | 370/394 |
| 2011/0041022 A1 | 2/2011 | Park et al. | |
| 2011/0085496 A1* | 4/2011 | Zhang | 370/328 |
| 2012/0163304 A1* | 6/2012 | Chun et al. | 370/328 |
| 2013/0035102 A1* | 2/2013 | Pham et al. | 455/450 |
| 2013/0107797 A1* | 5/2013 | Chion et al. | 370/315 |
| 2013/0176988 A1* | 7/2013 | Wang et al. | 370/331 |

OTHER PUBLICATIONS

Qualcomm Incorporated: "On deploying DC-HSDPA UEs in Single Frequency Networks", R1-104157, 3RD Generation Partnership Project (3GPP), Mobile Competence Centre ; 650, Route des Lucioles ; F-06921 Sophia-Antipolis Cedex , France, vol . RAN-WG1, No. Dresden, Germany; 20100629 Jul. 5, 2010, XP002633072, Retrieved from the Internet: URL:http://www.3gpp.org/ftp/tsg_ran/WG1_ RL 1/TSGR1_61b/Docs/R1-104157.zip [retrieved on Apr. 14, 2011].

Nokia Siemens Networks, Nokia, Multiflow performance evaluation[online], 3GPP TSG-RAN WG1#64 R1-111055, URL:http://www.3gpp.org/ftp/tsg_ran/WG1_RL1/TSGR1_64/Docs/R1-111055.zip, Feb. 21, 2011.

QUALCOMM Incorporated, UE based multi-link RLC for inter-site multi-point transmission in HSDPA[online], 3GPP TSG-RAN WG2#75bis R2-115202, <URL:http://www.3gpp.org/ftp/tsg_ran/WG2_RL2/TSGR2_75bis/Docs/R2-115202. zip>, Oct. 10, 2011.

* cited by examiner

METHODS AND APPARATUSES FOR USER EQUIPMENT-BASED ENHANCEMENTS OF RADIO LINK CONTROL FOR MULTI-POINT WIRELESS TRANSMISSION

CLAIM OF PRIORITY UNDER 35 U.S.C. §119

The present Application for Patent claims priority to Provisional Application No. 61/494,328 entitled "UE Based RLC Enhancements for HSDPA multi-point Transmission" filed Jun. 7, 2011, and assigned to the assignee hereof and hereby expressly incorporated by reference herein.

BACKGROUND

1. Field

Aspects of the present disclosure relate generally to wireless communication systems, and more particularly, to downlink channel aggregation in high-speed wireless networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

In HSDPA multipoint (MP) transmission (TX), the data stream is split for two cells to transmit. In intra-NodeB MP TX, a single Medium Access Control (MAC) entity is shared by the two cells, and thus the split can occur at the MAC layer. However, in inter-NodeB MP TX, the MAC entity at each NodeB is separate. When implementing the split in the data steam at the Radio Link Control (RLC) layer, then data packets can result in out-of-order delivery, or skew, between the two MAC entities on a downlink to user equipment (UE). UE has incomplete knowledge about the transmission in that skew cannot be readily distinguished from data loss.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method for wireless communication. The method further comprises receiving, by a transceiver of a user equipment, a first data stream from a first Medium Access Control (MAC) entity of a first cell and a second data stream from a second MAC entity of a second cell, decoding, by a Radio Link Control (RLC) receiver of the user equipment, RLC Packet Data Units (PDUs) having respective sequence numbers from the first data stream and the second data stream, transmitting an acknowledgment (ACK) for successfully received RLC PDUs, detecting a gap in sequence numbers in a selected one of the first data stream and the second data stream, delaying transmitting a not acknowledged (NAK) by starting a NAK delay timer, and transmitting NAK for the gap in sequence numbers in response to the NAK delay timer expiring and detecting that the gap has not been filled during the delaying.

In another aspect, the present disclosure provides at least one processor for wireless communication. A first module receives, by a transceiver of user equipment, a first data stream from a first MAC entity of a first cell and a second data stream from a second MAC entity of a second cell. A second module decodes, by a RLC receiver of the user equipment, RLC PDUs having respective sequence numbers from the first data stream and the second data stream. A third module transmits an ACK for successfully received RLC PDUs. A fourth module detects a gap in sequence numbers in a selected one of the first data stream and the second data stream. A fifth module delays transmitting a NAK by starting a NAK delay timer. A sixth module transmitting NAK for the gap in sequence numbers in response to the NAK delay timer expiring and detecting that the gap has not been filled during the delaying.

In an additional aspect, the present disclosure provides a computer program product for wireless communication comprising a non-transitory computer-readable storage medium for storing sets of code. A first set of code causes a computer to receive, by a transceiver of user equipment, a first data stream from a first MAC entity of a first cell and a second data stream from a second MAC entity of a second cell. A second set of code causes the computer to decoding, by a RLC receiver of the user equipment, RLC PDUs having respective sequence numbers from the first data stream and the second data stream. A third set of code causes the computer to transmit an ACK for successfully received RLC PDUs. A fourth set of code causes the computer to detect a gap in sequence numbers in a selected one of the first data stream and the second data stream. A fifth set of code causes the computer to delay transmitting a NAK by starting a NAK delay timer. A sixth set of code causes the computer to transmit NAK for the gap in sequence numbers in response to the NAK delay timer expiring and detecting that the gap has not been filled during the delaying.

In a further aspect, the present disclosure provides an apparatus for wireless communication. The apparatus comprises means for receiving, by a transceiver of user equipment, a first data stream from a first MAC entity of a first cell and a second data stream from a second MAC entity of a second cell. The apparatus comprises means for decoding, by a RLC receiver of the user equipment, RLC PDUs having respective sequence numbers from the first data stream and the second data stream. The apparatus comprises means for transmitting an ACK for successfully received RLC PDUs. The apparatus comprises means for detecting a gap in sequence numbers in a selected one of the first data stream and the second data stream. The apparatus comprises means for delaying transmitting a NAK by starting a NAK delay timer. The apparatus comprises means for transmitting NAK for the gap in sequence numbers in response to the NAK delay timer expiring and detecting that the gap has not been filled during the delaying.

In yet a further aspect, the present disclosure provides an apparatus for wireless communication. A transceiver of user equipment receives a first data stream from a first MAC entity of a first cell and a second data stream from a second MAC entity of a second cell. An RLC receiver of the user equipment decodes RLC PDUs having respective sequence numbers from the first data stream and the second data stream. The transceiver further transmits an ACK for successfully received RLC PDUs. A multipoint aggregation component detects a gap in sequence numbers in a selected one of the first data stream and the second data stream. The multipoint aggregation component further delays transmitting a NAK by starting a NAK delay timer. The multipoint aggregation component further transmits, by the transceiver, NAK for the gap in sequence numbers in response to the NAK delay timer expiring and detecting that the gap has not been filled during the delaying.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 1 is a schematic block diagram of user equipment for wireless communication by;

FIG. 1 is a diagram of user equipment and a base node for wireless communication;

FIG. 1 is a diagram illustrating an example of a hardware implementation for an apparatus employing a processing system.

DETAILED DESCRIPTION

In Inter-NodeB HSDPA multi-point transmission, the incoming data stream has to be split for the two cells at the two Node Bs. One option is to split the data at the radio link control layer (RLC). In this case, RLC enhancements are necessary to solve the issue of out-of-order delivery, or skew, between the two Media Access Control (MAC) entities. Alternatively or in addition to RNC delaying retransmissions of the skewed packets, a UE based approach can address skew in a manner that reduces feedback overhead.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
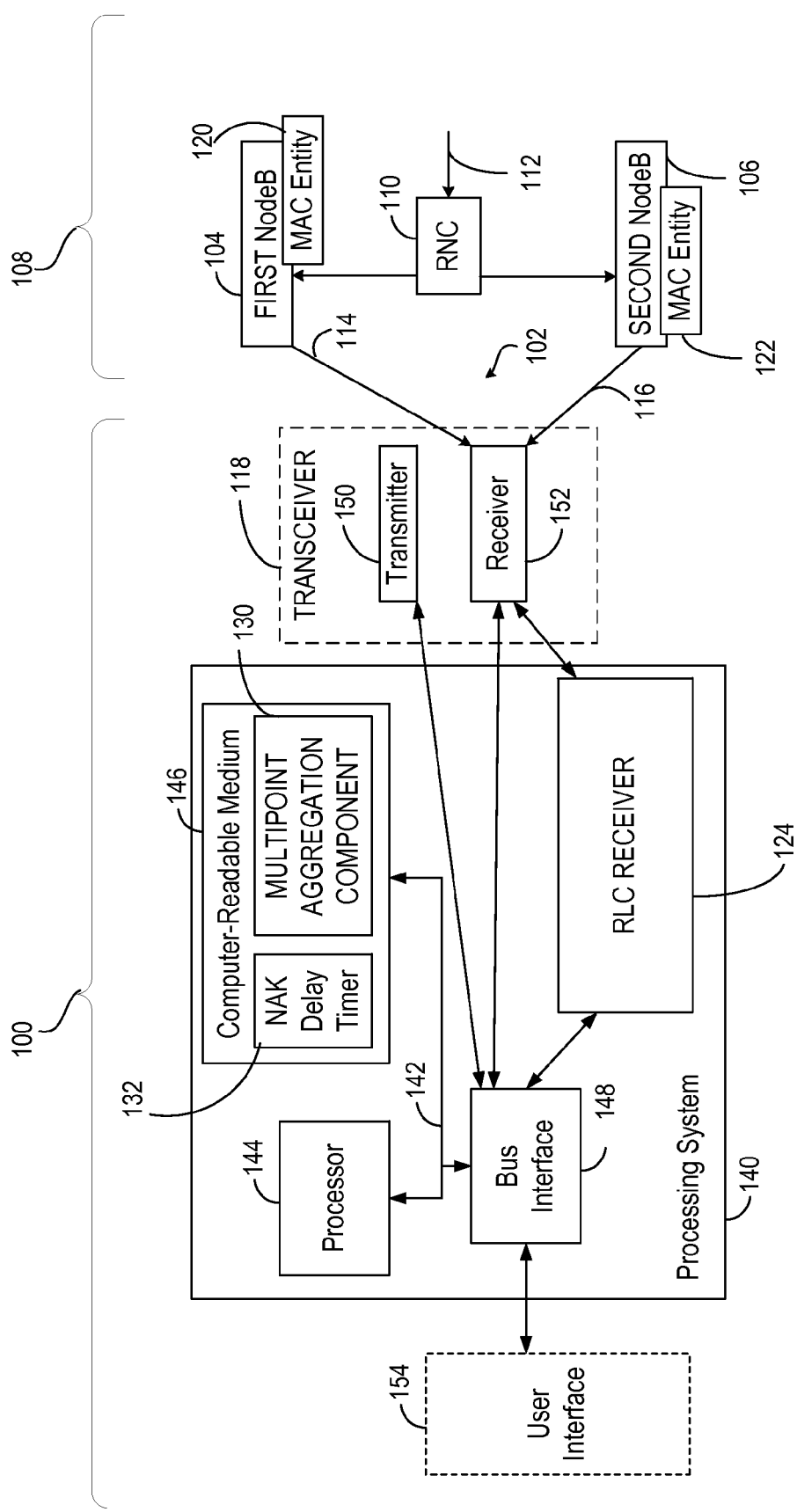

With reference to FIG. 1, the present disclosure provides an apparatus, depicted as user equipment 100 for wireless communication. UE 100 receives multi-point (MP) transmissions (TX) on a downlink 102 from first cell and a second cell, depicted respectively as a first NodeB 104 and a second NodeB 106 of a communication network 108. In an exemplary aspect, A Radio Network Controller (RNC) 110 separate a transmission data stream 112 into a first data stream 114 and a second data stream 116 for inter-NodeB transmission respectively by the first NodeB 104 and a second NodeB 106.

To that end, a transceiver 118 of the UE 100 receives the first data stream 114 from a first Medium Access Control (MAC) entity 120 of the first cell (first NodeB 104) and a second data stream 116 from a second MAC entity 122 of the second cell (second NodeB 106). A Radio Link Control (RLC) receiver 124 of the UE 100 decodes RLC Packet Data Units (PDUs) having respective sequence numbers from the first data stream 114 and the second data stream 116. The transceiver 118 further transmits an acknowledgment (ACK) for successfully received RLC PDUs.

A multipoint aggregation component 130 detects a gap in sequence numbers in a sequence number queue made up of sequence numbers from the first data stream 114 and sequence numbers from the second data stream 116, delays transmitting a not acknowledged (NAK) by starting a NAK delay timer 132, and transmits, by the transceiver 118, NAK for the gap in sequence numbers in the sequence number queue in response to the NAK delay timer 132 expiring and detecting that the gap has not been filled during the delaying.

In one aspect, the RLC receiver 124 further decodes the RLC PDUs by identifying that a selected RLC PDU was transmitted by the first MAC entity 120 or the second MAC entity 122. In an exemplary aspect, the multipoint aggregation component 130 further determines whether the gap in sequence numbers in the sequence number queue is due to skew by out-of-order delivery or due to data loss by tracking sequence numbers for RLC PDUs received from each of the first MAC entity 120 and the second MAC entity 122, determining a highest sequence number respectively corresponding to each of the first MAC entity 120 and the second MAC entity 122, wherein the transmitting the NAK for the gap in sequence numbers in the sequence number queue is in response to determining that the gap in sequence numbers in the sequence number queue is lower than each of the respective highest sequence numbers.

In another aspect, the multipoint aggregation component 130 further determines a skew duration when the gap in sequence numbers in the sequence number queue is subsequently filled, and adapts the NAK delay timer 132 to correspond to the skew duration.

With further reference to FIG. 1, a hardware implementation for the apparatus (UE 100) can employ a processing system 140. In this example, the processing system 140 may be implemented with a bus architecture, represented generally by the bus 142. The bus 142 may include any number of interconnecting buses and bridges depending on the specific application of the processing system 140 and the overall design constraints. The bus 142 links together various circuits including one or more processors, represented generally by a processor 144, and computer-readable media, represented generally by a computer-readable medium 146. The bus 142 may also link various other circuits such as timing sources, peripherals, voltage regulators, and power management circuits, which are well known in the art, and therefore, will not be described any further. A bus interface 148 provides an interface between the bus 142 and a transceiver 118 comprising a transmitter 150 and a receiver 152. The transceiver 118 provides a means for communicating with various other apparatus over a transmission medium. Depending upon the nature of the apparatus, a user interface 154 (e.g., keypad, display, speaker, microphone, joystick) may also be provided.

The processor 144 is responsible for managing the bus 142 and general processing, including the execution of software stored on the computer-readable medium 146. The software, when executed by the processor 144, causes the processing system 140 to perform the various functions described infra for any particular apparatus. The computer-readable medium 146 may also be used for storing data that is manipulated by the processor 144 when executing software.

In an exemplary aspect, the multipoint aggregation component 130 can reside at least in part within the computer-readable medium 146.

Figure 2:
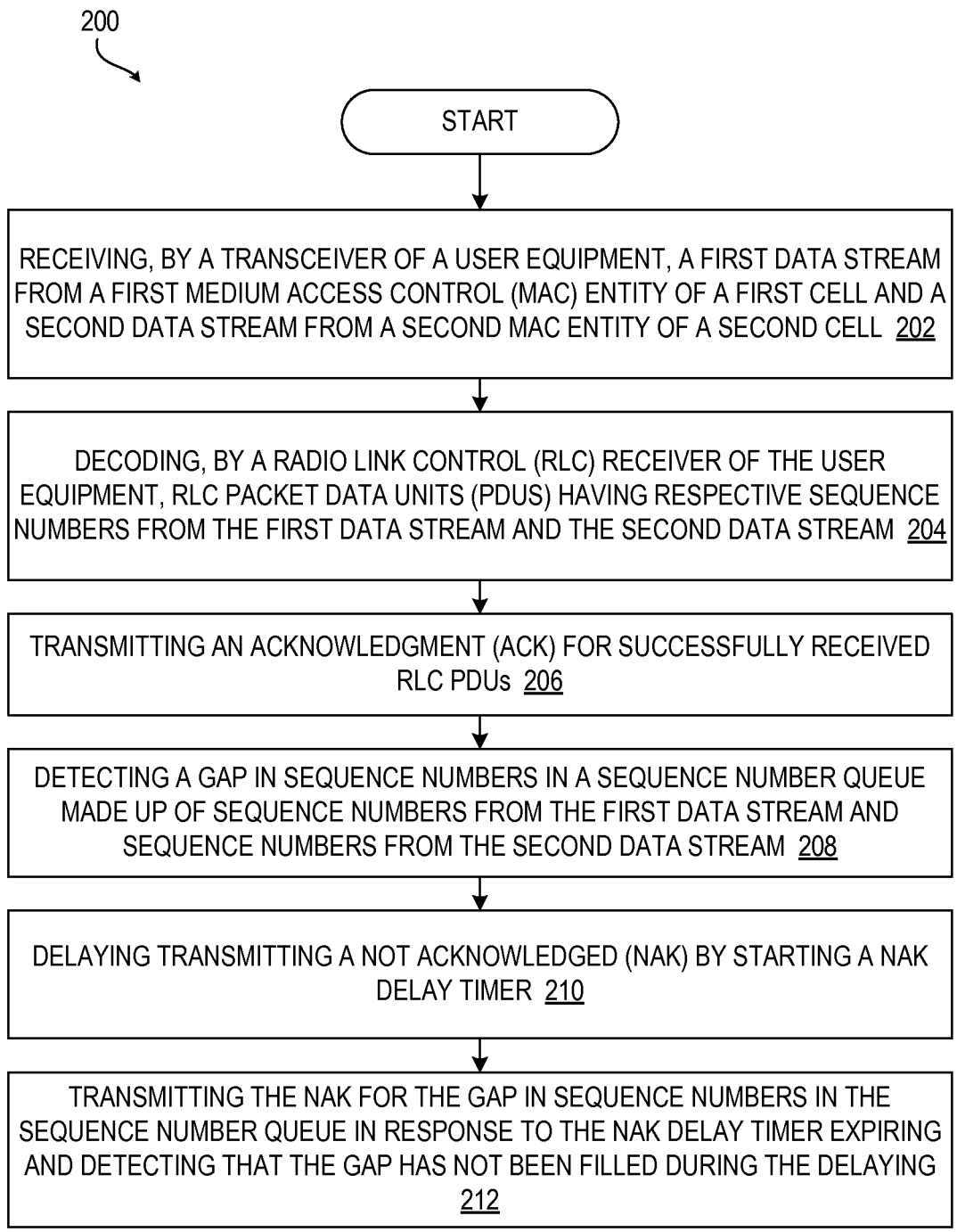
FIG. 2 is a flow diagram of a method for aggregating multipoint transmission by the apparatus of FIG. 1.

In FIG. 2, the present disclosure provides a methodology 200 for wireless communication. The method further comprises receiving, by a transceiver of a user equipment, a first data stream from a first MAC entity of a first cell and a second data stream from a second MAC entity of a second cell (block 202). Decoding is performed by a RLC receiver of the user equipment of RLC PDUs having respective sequence numbers from the first data stream and the second data stream (block 204). An ACK is transmitted for successfully received RLC PDUs (block 206). A gap is detected in sequence numbers in a sequence number queue, which is made up of sequence numbers from the first data stream and sequence numbers from the second data stream (block 208). Transmitting a NAK is delayed by starting a NAK delay timer (block 210). The NAK is transmitted for the gap in sequence numbers in the sequence number queue in response to the NAK delay timer expiring and detecting that the gap has not been filled during the delaying (block 212).

In one aspect, the method 200 further comprises decoding the RLC PDUs further comprises identifying that a selected RLC PDU was transmitted by the first MAC entity or the second MAC entity. In an exemplary aspect, the method 200 further comprises determining whether the gap in sequence numbers in the sequence number queue is due to skew by out-of-order delivery or due to data loss by tracking sequence numbers for RLC PDUs received from each of the first MAC entity and the second MAC entity, determining a highest sequence number respectively for each of the first MAC entity and the second MAC entity, and transmitting the NAK for the gap in sequence numbers in the sequence number queue in response to determining that the gap in sequence numbers is lower than all of the highest sequence numbers.

In another aspect, the method 200 further comprises tracking a skew duration by detecting when the gap in sequence numbers in the sequence number queue is subsequently filled, and adapting the NAK delay timer to correspond to the skew duration.

Figure 3:
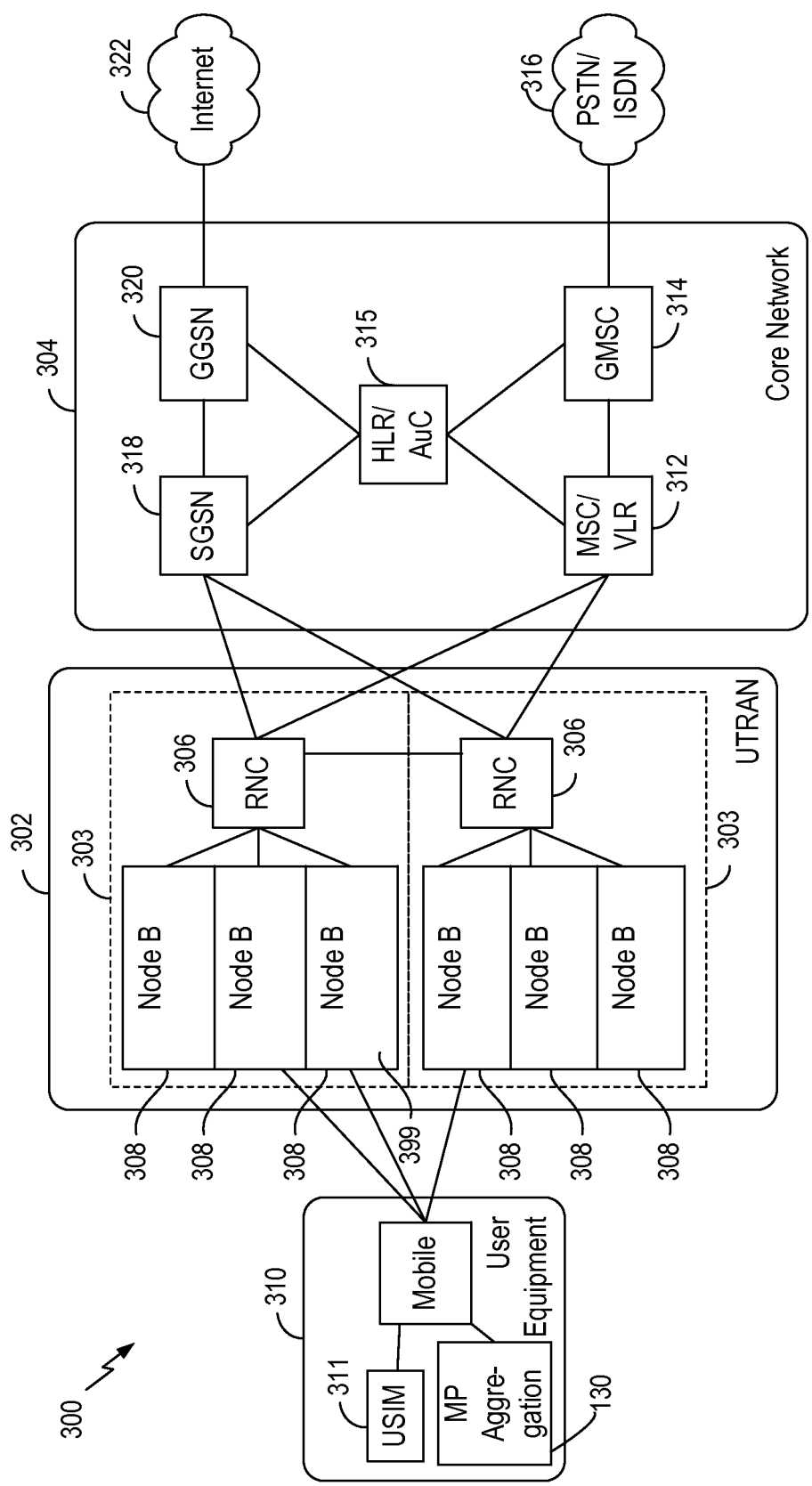
FIG. 3 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 3 are presented with reference to a UMTS system 300 employing a W-CDMA air interface. A UMTS network includes three interacting domains: a Core Network (CN) 304, a UMTS Terrestrial Radio Access Network (UTRAN) 302, and User Equipment (UE) 310. In this example, the UTRAN 302 provides various wireless services including telephony, video, data, messaging, broadcasts, and/or other services. The UTRAN 302 may include a plurality of Radio Network Subsystems (RNSs) such as an RNS 303, each controlled by a respective Radio Network Controller (RNC) such as an RNC 306. Here, the UTRAN 302 may include any number of RNCs 306 and RNSs 303 in addition to the RNCs 306 and RNSs 303 illustrated herein. The RNC 306 is an apparatus responsible for, among other things, assigning, reconfiguring, and releasing radio resources within the RNS 303. The RNC 306 may be interconnected to other RNCs (not shown) in the UTRAN 302 through various types of interfaces such as a direct physical connection, a virtual network, or the like, using any suitable transport network.

Communication between a UE 310 and a NodeB 308 may be considered as including a physical (PHY) layer and a medium access control (MAC) layer. Further, communication between a UE 310 and an RNC 306 by way of a respective NodeB 308 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 303 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 308 are shown in each SRNS 303; however, the SRNSs 303 may include any number of wireless NodeBs. The NodeBs 308 provide wireless access points to a core network (CN) 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the NodeBs 308. The downlink (DL), also called the forward link, refers to the communication link from a NodeB 308 to a UE 310, and the uplink (UL), also called the reverse link, refers to the communication link from a UE 310 to a NodeB 308.

The core network 304 interfaces with one or more access networks, such as the UTRAN 302. As shown, the core network 304 is a GSM core network. However, as those skilled in the art will recognize, the various concepts presented throughout this disclosure may be implemented in a RAN, or other suitable access network, to provide UEs with access to types of core networks other than GSM networks.

The core network 304 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The core network 304 also supports packet-data services with a serving GPRS support node (SGSN) 318 and a gateway GPRS support node (GGSN) 320. GPRS, which stands for General Packet Radio Service, is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 308 and a UE 310. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 310 provides feedback to the NodeB 308 over the HS-DPCCH to indicate whether it correctly decoded a packet on the downlink.

HS-DPCCH further includes feedback signaling from the UE 310 to assist the NodeB 308 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the NodeB 308 and/or the UE 310 may have multiple antennas supporting MIMO technology. The use of MIMO technology enables the NodeB 308 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 310 to increase the data rate or to multiple UEs 310 to increase the overall system capacity. This is achieved by spatially precoding each data stream and then transmitting each spatially precoded stream through a different transmit antenna on the downlink. The spatially precoded data streams arrive at the UE(s) 310 with different spatial signatures, which enables each of the UE(s) 310 to recover the one or more the data streams destined for that UE 310. On the uplink, each UE 310 may transmit one or more spatially precoded data streams, which enables the NodeB 308 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

UE 310 can incorporate an MP aggregation component 130 that can perform the methodology 200 and other aspects as described herein.

Figure 4:
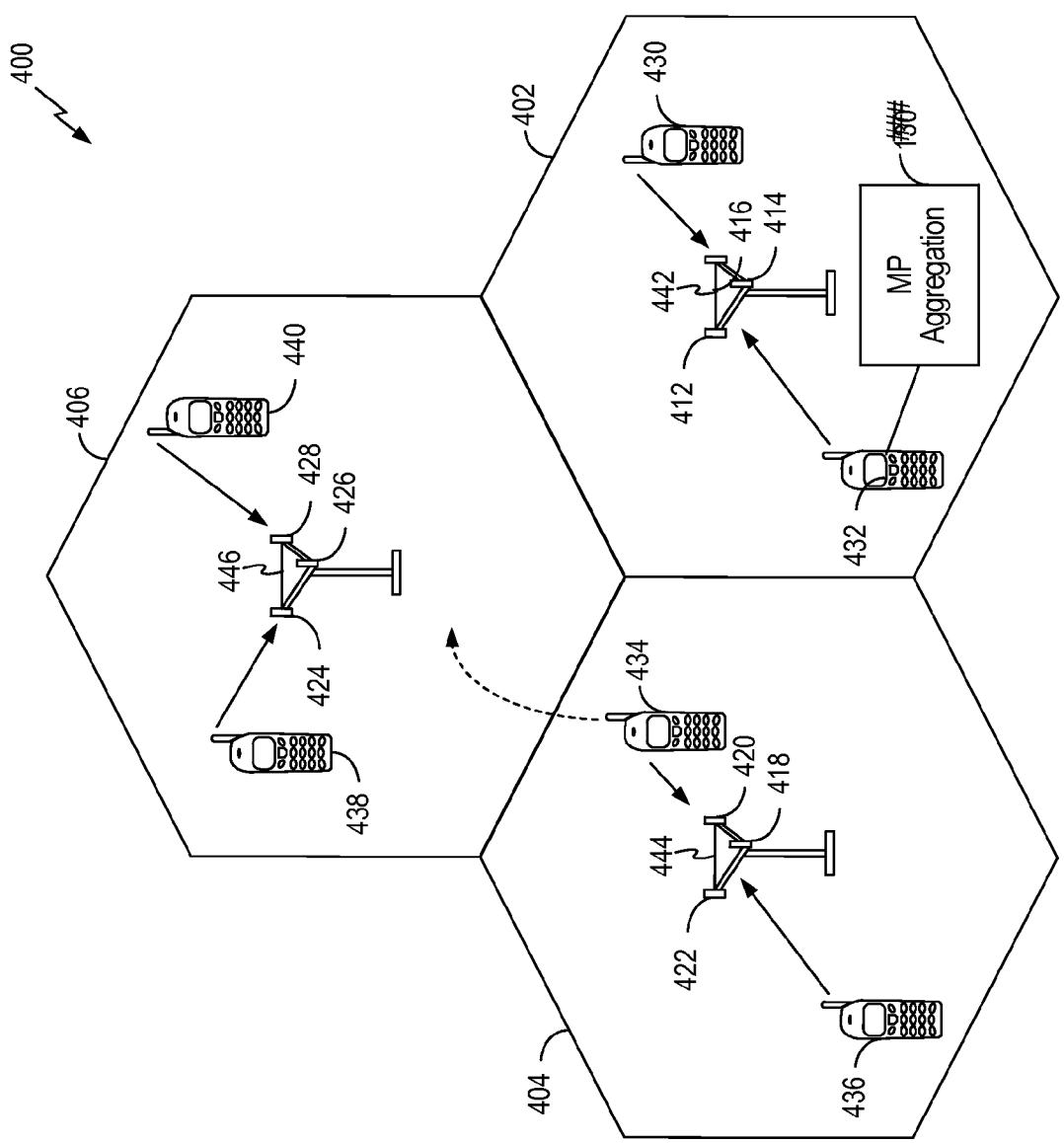
FIG. 4 is a conceptual diagram illustrating an example of an access network.

Referring to FIG. 4, an access network 400 in a UTRAN architecture is illustrated. The multiple access wireless communication system includes multiple cellular regions (cells), including cells 402, 404, and 406, each of which may include one or more sectors. The multiple sectors can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 406, antenna groups 424, 426, and 428 each correspond to a different sector. The cells 402, 404 and 406 may include several wireless communication devices, e.g., User Equipment or UEs, which may be in communication with one or more sectors of each cell 402, 404 or 406. For example, UEs 430 and 432 may be in communication with NodeB 442, UEs 434 and 436 may be in communication with NodeB 444, and UEs 438 and 440 can be in communication with NodeB 446. Here, each NodeB 442, 444, 446 is configured to provide an access point to a core network for all the UEs 430, 412, 434, 436, 438, 440 in the respective cells 402, 404, and 406.

As the UE 434 moves from the illustrated location in cell 404 into cell 406, a serving cell change (SCC) or handover may occur in which communication with the UE 434 transitions from the cell 404, which may be referred to as the source cell, to cell 406, which may be referred to as the target cell. Management of the handover procedure may take place at the UE 434, at the NodeBs corresponding to the respective cells, at a radio network controller 406, or at another suitable node in the wireless network. For example, during a call with the source cell 404, or at any other time, the UE 434 may monitor various parameters of the source cell 404 as well as various parameters of neighboring cells such as cells 406 and 402. Further, depending on the quality of these parameters, the UE 434 may maintain communication with one or more of the neighboring cells. During this time, the UE 434 may maintain an Active Set, that is, a list of cells that the UE 434 is simultaneously connected to (i.e., the UTRA cells that are currently assigning a downlink dedicated physical channel DPCH or fractional downlink dedicated physical channel F-DPCH to the UE 434 may constitute the Active Set).

The modulation and multiple access scheme employed by the access network 400 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The UE 432 can incorporate an MP aggregation component 130 that can perform the methodology 200 and other aspects as described herein.

Figure 5:
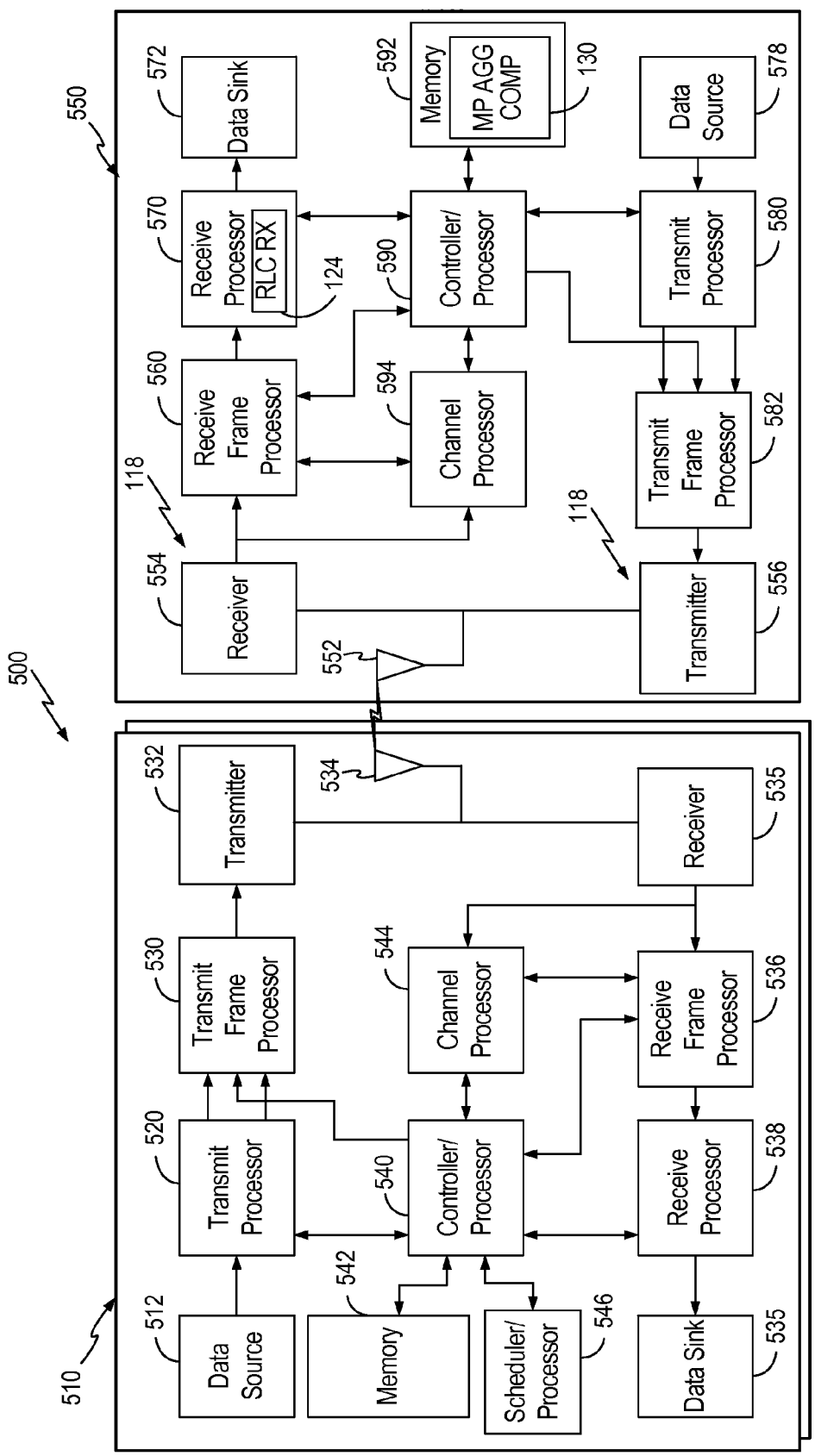
FIG. 5 is a block diagram conceptually illustrating an example of a Node B in communication with a UE in a telecommunications system.

FIG. 5 is a block diagram of a NodeB 510 in communication with a UE 550, where the NodeB 510 may be the NodeB 500 (FIG. 5), and the UE 550 may be the UE 514 (FIG. 5). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the NodeB 510. More specifically, the receive processor 570 descrambles and despreads the symbols, and then determines the most likely signal constellation points transmitted by the NodeB 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the NodeB 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the NodeB 510 or from feedback contained in the midamble transmitted by the NodeB 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the NodeB 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 535 and the controller/processor, respectively. If some of the frames were unsuccessfully decoded by the receive processor, the controller/processor 540 may also use an acknowledgement (ACK) and/or negative acknowledgement (NAK) protocol to support retransmission requests for those frames.

The controller/processors 540 and 590 may be used to direct the operation at the NodeB 510 and the UE 550, respectively. For example, the controller/processors 540 and 590 may provide various functions including timing, peripheral interfaces, voltage regulation, power management, and other control functions. The computer readable media of memories 542 and 592 may store data and software for the NodeB 510 and the UE 550, respectively. A scheduler/processor 546 at the NodeB 510 may be used to allocate resources to the UEs and schedule downlink and/or uplink transmissions for the UEs.

The receiver processor 570 can utilize an RLC Receiver 124 that decodes RLC PDUs for an MP aggregation component 130 that is resident respectively in memory 592.

Figure 6:
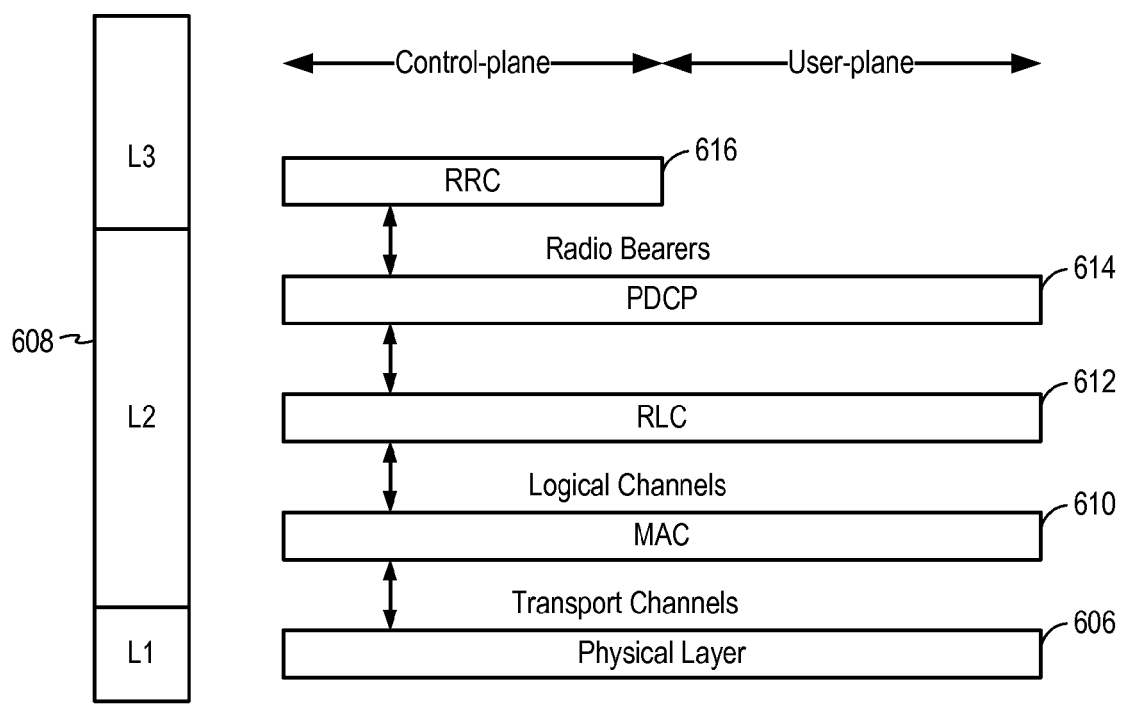
FIG. 6 is a conceptual diagram illustrating an example of a radio protocol architecture for the user and control plane.

The radio protocol architecture may take on various forms depending on the particular application. An example for an HSPA system will now be presented with reference to FIG. 6. FIG. 6 is a conceptual diagram illustrating an example of the radio protocol architecture for the user and control planes.

Turning to FIG. 6, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 606. Layer 2 (L2 layer) 608 is above the physical layer 606 and is responsible for the link between the UE and node B over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the node B on the network side. Although not shown, the UE may have several upper layers above the L2 layer 608 including a network layer (e.g., IP layer) that is terminated at a PDN gateway on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between NodeBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

Figure 7:
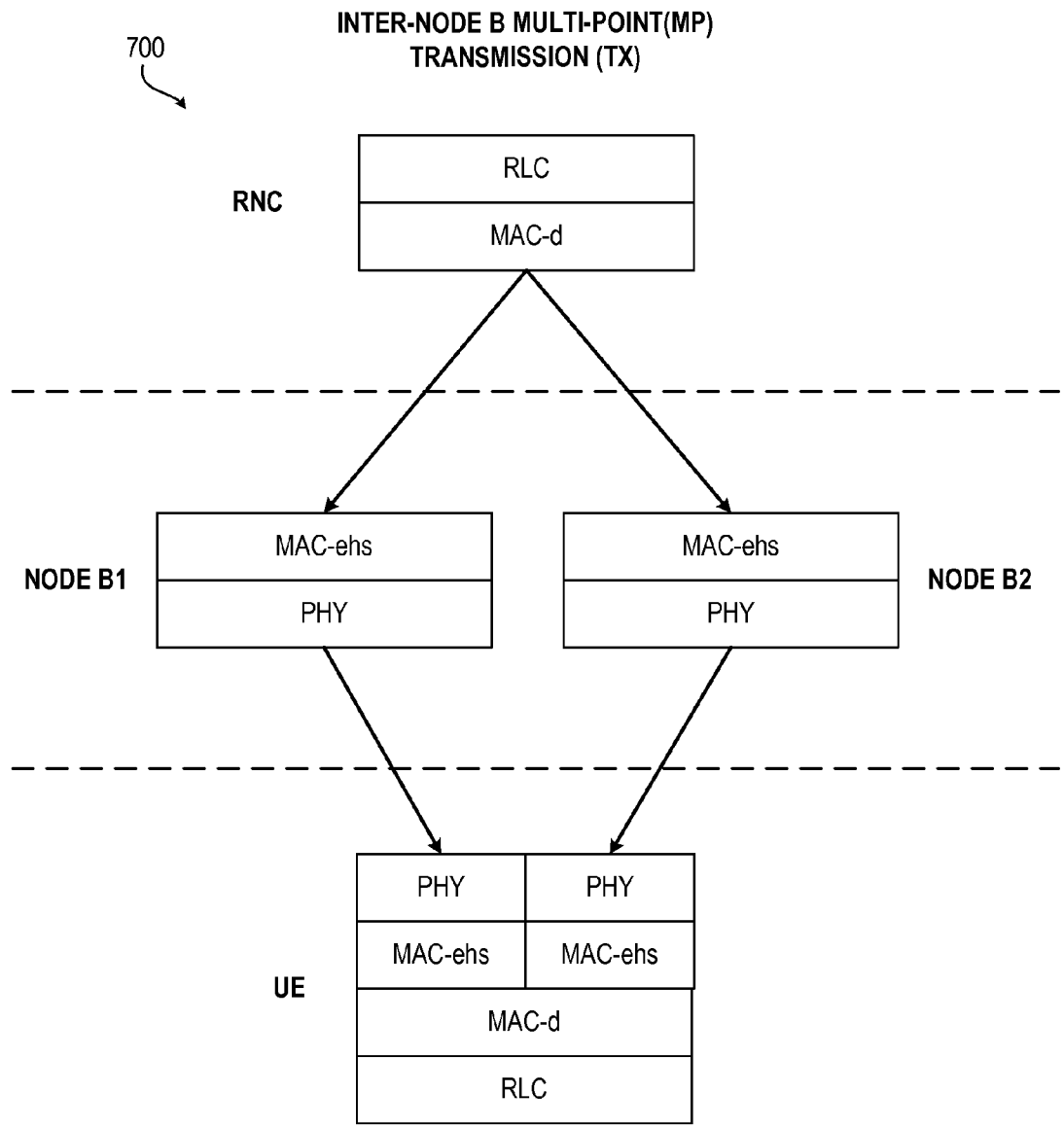
FIG. 7 is a conceptual diagram illustrating an example of a radio protocol architecture for Inter-NodeB HSPDA multipoint transmission.

In FIG. 7, In FIG. 7 as depicted at 700, the incoming data stream in HSDPA multi-point transmission has to be split for the two cells. By contrast in Intra-NodeB multi-point transmission, the split is on the MAC layer, namely, the two cells have a shared MAC entity and separate physical layer entities including separate HARQs. There is no need to enhance the RLC for Intra-NodeB multi-point transmission. In Inter-NodeB multi-point transmission, the split must be above MAC since the MAC entity at each Node B must be separate. One option is to split the data at RLC. In this case, RLC enhancements are necessary to solve the issue of out-of-order delivery, or skew, between the two MAC entities.

Figure 8:
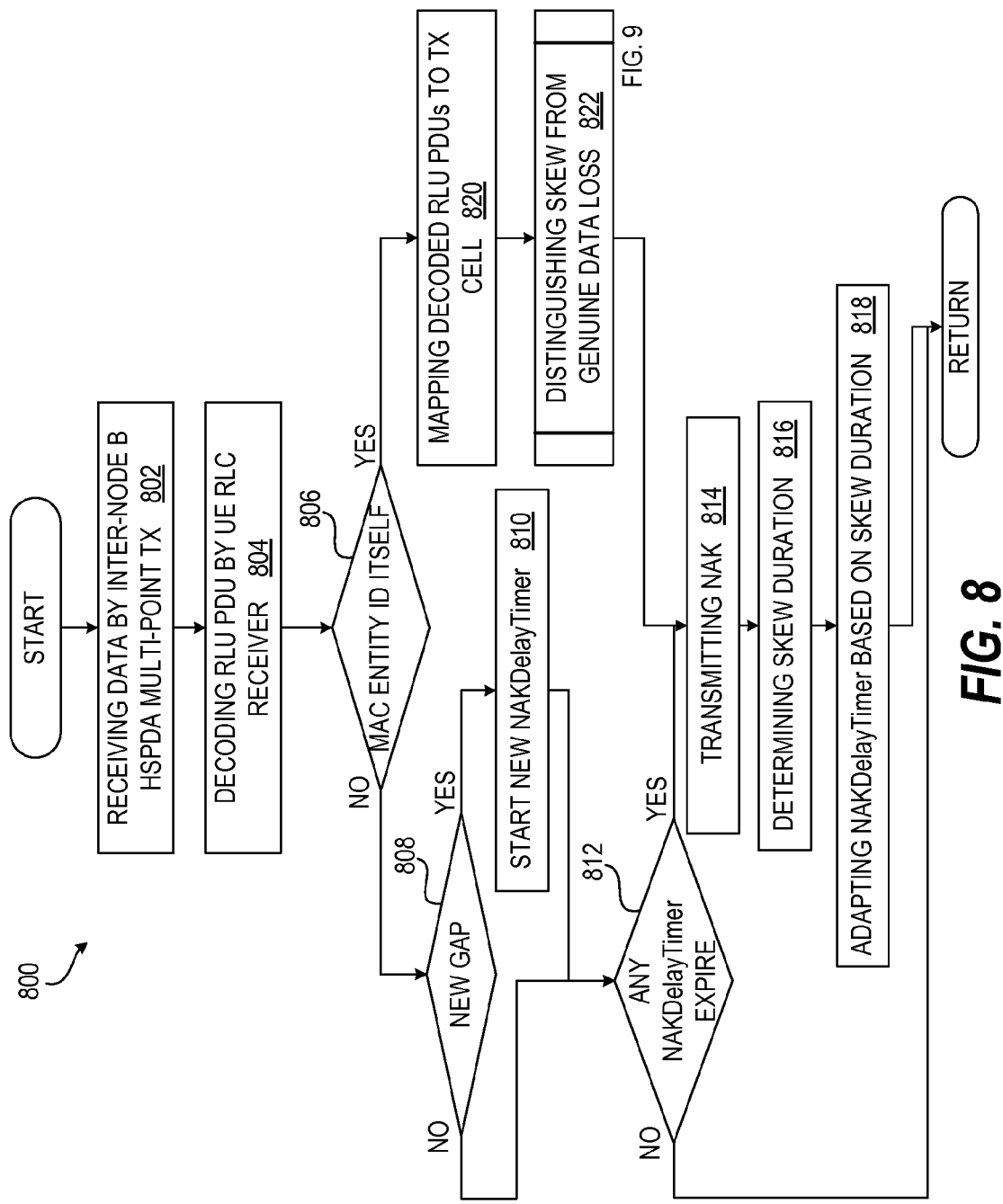
FIG. 8 is a flow diagram of a methodology for aggregating Inter-NodeB HSPDA multipoint transmission.

In FIG. 8, a method 800 is provided for aggregating data in wireless communication at a UE. Data received by inter-NodeB HSPDA MP TX (block 802). RLU PDU is decoded by UE RLC receiver (block 804). A determination is made either explicitly or implicitly as to whether the respective MAC entity identified itself to the RLC (block 806). If not, a determination is made as to whether this is a new gap (block 808). If so, a new NAKDelayTimer is started (block 810). If not a new gap in block 808 or after block 810, then a further determination is made as to whether any NAKDelayTimer has expired (block 812). If so, the corresponding NAK is transmitted (block 814).

In some instances, the missing data will fill the gap before the NAKDelayTimer expires. In these instances, adaptive timer adjustments can be achieved by determining skew duration (block 816). Then, the NAKDelayTimer can be adapted in correspondence to the skew duration (block 818).

Returning to block 806, if the MAC entity did identify itself to the RLC as detected in the decoding, then the RLC receiver can map the decoded RLU PDUs to the transmitting cell (NodeB) (block 820). With this information, then skew can be distinguished from genuine data loss (block 822)

Figure 9:
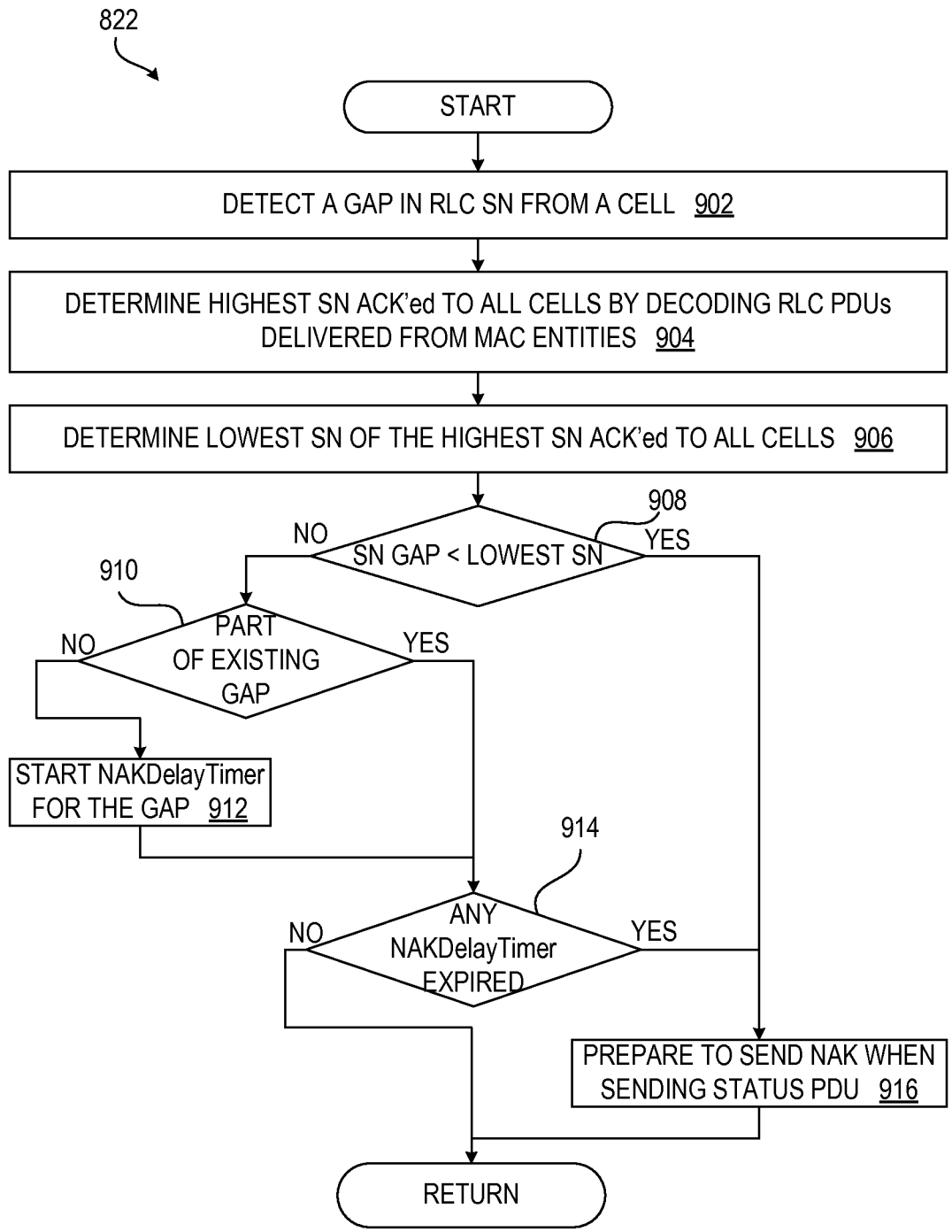
FIG. 9 is a flow diagram of a method for the methodology of FIG. 8 for distinguishing skew from data loss.

In FIG. 9, an illustrative implementation of block 822 (FIG. 8), a gap is detected in RLC sequence numbers (SN) in a sequence number queue made up of sequence numbers from a first data stream and a second data stream (block 902). The highest SN ACKed to all cells is determined based upon the decoded RLC PDUs delivered from all MAC entities (block 904). From these, a further determination is made to which is the lowest SN of these highest SN ACKed to all cells (block 906). Then a determination is made as to whether the SN gap is lowest (lower than the previously identified lowest of the highest SN ACKED to all cells) (block 908). If not, a determination is made as to whether the newly detected gap is merely part of an existing gap (block 910). If not, then a NAKDelayTimer is started for the new gap (block 912). If part of an existing gap in block 910 or after block 912, then a determination is made as to whether any NAKDelayTimer has expired (block 914). If so, the NAK is sent with the Status PDU (block 916).

Returning to block 908, if the SN gap was lower, then a genuine data loss has been found, so processing can proceed to block 916 to expedite sending the NAK without waiting for a corresponding NAKDelayTimer to expire.

Figure 10:
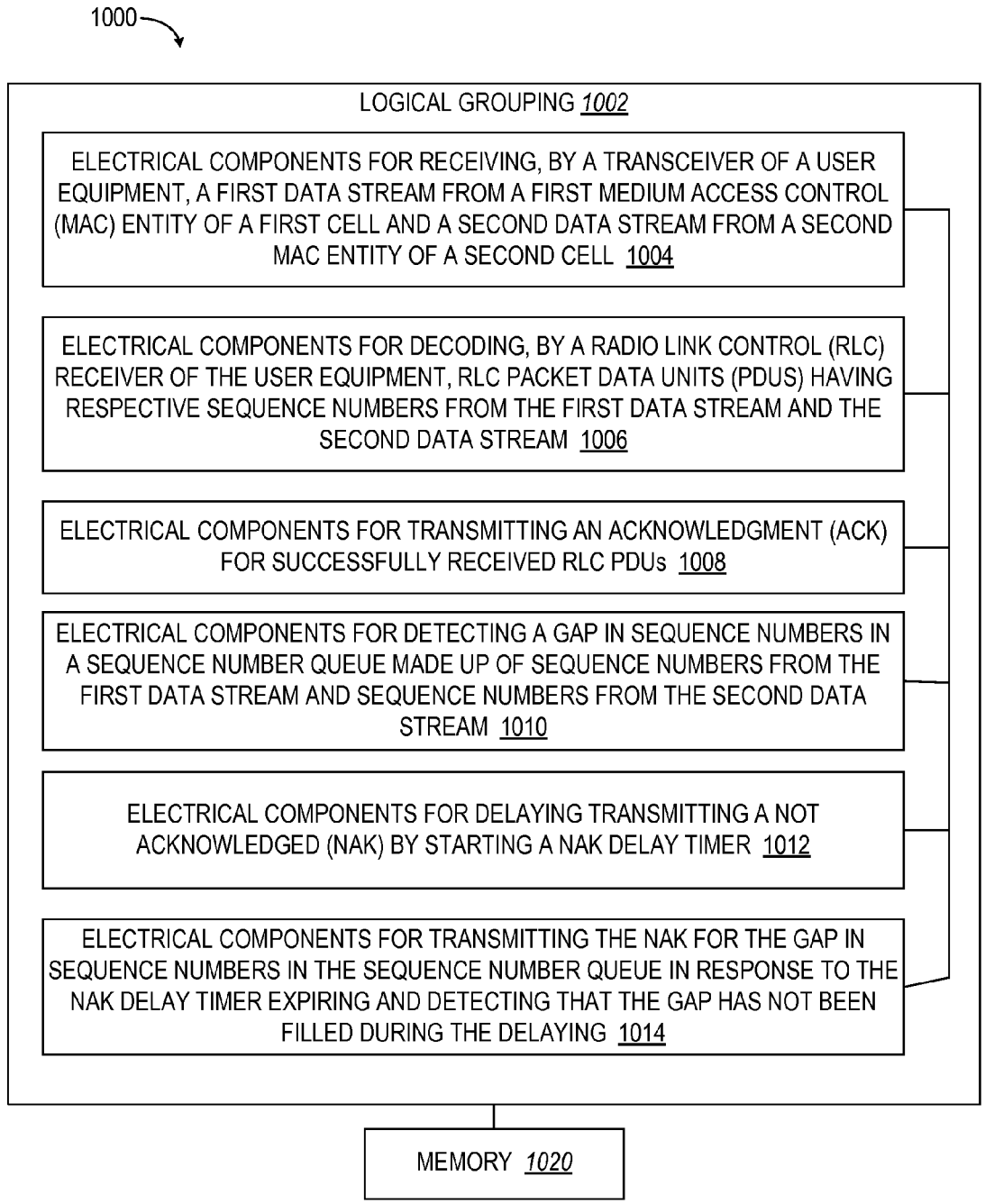
FIG. 10 is a block diagram of a system of logical groups of electrical components for wireless communication.

With reference to FIG. 10, illustrated is a system 1000 for wireless communication. For example, system 1000 can reside at least partially within user equipment that is capable of Over-The-Air (OTA) communication. It is to be appreciated that system 1000 is represented as including functional blocks, which can be functional blocks that represent functions implemented by a computing platform, processor, software, or combination thereof (e.g., firmware). System 1000 includes a logical grouping 1002 of electrical components that can act in conjunction. For instance, logical grouping 1002 can include an electrical component 1004 for receiving, by a transceiver of user equipment, a first data stream from a first Medium Access Control (MAC) entity of a first cell and a second data stream from a second MAC entity of a second cell. Moreover, logical grouping 1002 can include an electrical component 1006 for decoding, by a Radio Link Control (RLC) receiver of the user equipment, RLC Packet Data Units (PDUs) having respective sequence numbers from the first data stream and the second data stream. Further, logical grouping 1002 can include an electrical component 1008 for transmitting an acknowledgment (ACK) for successfully received RLC PDUs. Further, logical grouping 1002 can include an electrical component 1010 for detecting a gap in sequence numbers in a sequence number queue made up of sequence numbers from the first data stream and sequence numbers from the second data stream. In addition, logical grouping 1002 can include an electrical component 1012 for delaying transmitting a not acknowledged (NAK) by starting a NAK delay timer. Further, logical grouping 1002 can include an electrical component 1014 for transmitting the NAK for the gap in sequence numbers in the sequence number queue in response to the NAK delay timer expiring and detecting that the gap has not been filled during the delaying. Additionally, system 1000 can include a memory 1020 that retains instructions for executing functions associated with electrical components 1004-1014. While shown as being external to memory 1020, it is to be understood that one or more of electrical components 1004-1014 can exist within memory 1020.

Exemplary aspects described herein are largely or entirely performed by UE in aggregating multipoint transmission on a downlink to address skew between deliveries from different MAC entities, especially when data loss can occur. It should be appreciated with the benefit of the present disclosure addresses that complimentary and independent features can be implemented in the Radio Network Controller (RNC), NodeBs, or other network entities to address data aggregation in HSPDA MP TX.

By virtue of the foregoing, it should be appreciated in one aspect that the UE can delay all NAKs using a NAKDelayTimer. The UE starts a timer for any new gap detected, with one timer per gap. If the timer of a gap expires, a NAK is sent for to request the remaining missing data. Thereby, no additional information exchange is required between MAC and RLC. Processing does not determining the highest sequence number that has been ACKed for each cell. In some instances, a NAK for a genuine data loss can be delayed by the NAKDelayTimer.

In another aspect, the UE can partially recover information as which to cell a RLC PDU was sent from if each of the MAC entities exposes its identity when delivering data to the RLC entity. Thereby, the UE RLC receiver can map each decoded RLU PDU to the originating cell to which it was sent by the RNC. If a sequence number gap seen by the UE is lower than the lowest among the highest ACKed sequence numbers in each of the cells, then the gap is a genuine loss of data, without having to wait for the NAKDelayTimer expiring. Otherwise, the UE can start a timer (NAKDelayTimer) for each new gap that it receives. When this timer expires, the remaining gap can be NAKed.

In an additional aspect, genuine loss can be distinguished from skew by the UE when the UE has the knowledge of the highest sequence number ACKed in each cell based on the decoded RLC PDUs delivered from the MAC entities. If a sequence number gap seen by the UEs is lower than the lowest among the highest ACKed sequence numbers in ALL the cells, this gap is a genuine loss for sure. Otherwise, the UE starts a timer (NAKDelayTimer) for each new gap it receives. When this timer expires, the remaining gap will be NAKed. NAK generation can be by the UE RLC receiver. Note that when it is time to generate the Status PDU, the UE can check again to confirm whether any gap it is going to NAK has been filled. If so, the NAK is not sent for that gap.

Compared with the RNC based approach, this UE based approach delays the NAK generation. In effect, the retransmission for the genuine loss is delayed up to the duration between the time instant that this gap becomes lower than the highest ACKed sequence number in the same cell, and the time instant that this gap becomes lower than the lowest among highest ACKed sequence number in all the cells. If the RNC sends data to each cell in an alternate fashion with small batches, this extra delay may be very small. On the other hand, when large skew happens, or genuine loss rate is high, the UE based algorithm is clearly inferior to the RNC based algorithm.

An advantage of the UE based approach is that it reduces the number of NAKs in the Status PDU and therefore reduces the feedback overhead.

In a further aspect, the NAKDelayTimer can be adapted to correspond with a skew duration being experienced. For each gap or hole seen by the UE but eventually filled before a NAK is sent, the UE can keep track of the duration between the appearance and filling of the hole. This duration can be referred to as DurationSkew. The measured DurationSkew can be used to adapt the value for the NAKDelayTimer. One illustrative rule is:

NAKDelayTimer<=(1−1/$Tc$)*NAKDelayTimer+ (1/$Tc$)*Duration Skew.

The timer adaptation by the UE can be easier than by the RNC due to accurate measurement of the duration of a skew at the UE.

For clarity, multipoint transmission is described herein as being from two cells or nodes; however, aspects consistent with the present innovation can be extended to more than two. RNC based RLC enhancements to RNC to distinguish genuine loss from skew by comparing a gap in the RLC sequence number with the highest sequence number that was acknowledged ("ACKed") in that cell. This is possible for the RNC as long as it remembers which packets are sent to which cell so that it can associate each gap to the cell where the data are sent originally. The UE can't associate the gap with the cell to which the data are sent.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method for wireless communication, comprising:
receiving, by a user equipment, a plurality of data streams that together carry a data transmission, the plurality of data streams including a first data stream from a first cell and a second data stream from a second cell, the first data stream and the second data stream comprising Radio

Link Control (RLC) Packet Data Units (PDUs) having respective sequence numbers of the data transmission;

detecting, at the user equipment, a gap in the sequence numbers of the RLC PDUs;

delaying, at the user equipment, transmitting a not acknowledged (NAK) for the gap in the sequence numbers of the RLC PDUs by starting a NAK delay timer in the user equipment upon detecting the gap;

determining, at the user equipment during a delay period after the NAK delay timer has started, whether the NAK delay timer has expired;

detecting, at the user equipment during the delay period, whether the gap has been filled, and determining, at the user equipment during the delay period, whether each sequence number of the gap is lower than each of a highest sequence number of the first data stream and a highest sequence number of the second data stream before the NAK delay timer has expired, and transmitting, by the user equipment, the NAK upon a determination of a first to occur of:
 the user equipment determining that the NAK delay timer has expired and detecting that the gap has not been filled during the delay period; and
 the user equipment determining that each sequence number of the gap is lower than each of the highest sequence number of the first data stream and the highest sequence number of the second data stream before the NAK delay timer has expired.

2. The method of claim 1, further comprising identifying whether a selected RLC PDU was transmitted by a first Medium Access Control (MAC) entity of the first cell or a second MAC entity of the second cell.

3. The method of claim 1, further comprising:
 tracking, at the user equipment, a skew duration by detecting when the gap in the sequence numbers of the RLC PDUs is subsequently filled; and
 adapting, at the user equipment, the NAK delay timer to correspond to the skew duration.

4. The method of claim 1, wherein the instructions executable by the processor to detect a gap in the sequence numbers of the RLC PDUs comprises instructions executable by the processor to detect the gap in the sequence numbers of the RLC PDUs in a sequence number queue and the sequence number queue comprises a compilation of the sequence numbers from the first data stream and the sequence numbers from the second data stream.

5. The method of claim 1, wherein the method is for a High Speed Download Packet Access (HSDPA) system.

6. The method of claim 1, wherein the RLC PDUs have varying packet sizes.

7. The method of claim 1, wherein the instructions further comprise instructions being executable by the processor to:
 determine whether the gap comprises a new gap or an existing gap;
 start a new NAK delay timer for the gap based on a determination that the gap comprises a new gap; and
 transmit the NAK based on a determination that the gap comprises an existing gap where an existing NAK delay timer corresponding to the existing gap has expired.

8. At least one processor for wireless communication, comprising:
 a first module for receiving, by a user equipment, a plurality of data streams that together carry a data transmission, the plurality of data streams including a first data stream from a first cell and a second data stream from a second cell, the first data stream and the second data stream comprising Radio Link Control (RLC) Packet Data Units (PDUs) having respective sequence numbers of the data transmission;
 a second module for detecting, at the user equipment, a gap in the sequence numbers of the RLC PDUs;
 a third module for delaying, at the user equipment, transmitting a not acknowledged (NAK) for the gap in the sequence numbers of the RLC PDUs by starting a NAK delay timer in the user equipment upon detecting the gap;
 a fourth module for determining, at the user equipment during a delay period after the NAK delay timer has started, whether the NAK delay timer has expired;
 a fifth module for detecting, at the user equipment during the delay period, whether the gap has been filled;
 a sixth module for determining, at the user equipment during the delay period, whether each sequence number of the gap is lower than each of a highest sequence number of the first data stream and a highest sequence number of the second data stream before the NAK delay timer has expired; and
 a seventh module for transmitting, by the user equipment, the NAK upon a determination of a first to occur of:
  the user equipment determining that the NAK delay timer has expired and detecting that the gap has not been filled during the delay period; and
  the user equipment determining that each sequence number of the gap is lower than each of the highest sequence number of the first data stream and the highest sequence number of the second data stream before the NAK delay timer has expired.

9. A non-transitory computer-readable medium storing computer-executable code, that when executed by a processor, causes a user equipment to:
 receive a plurality of data streams that together carry a data transmission, the plurality of data streams including a first data stream from a first cell and a second data stream from a second cell, the first data stream and the second data stream comprising Radio Link Control (RLC) Packet Data Units (PDUs) having respective sequence numbers of the data transmission;
 detect a gap in the sequence numbers of the RLC PDUs;
 delay transmitting a not acknowledged (NAK) for the gap in the sequence numbers of the RLC PDUs by starting a NAK delay timer in the user equipment upon detecting the gap;
 determine, during a delay period after the NAK delay timer has started, whether the NAK delay timer has expired;
 detect, at the user equipment during the delay period, whether the gap has been filled;
 determine, at the user equipment during the delay period, whether each sequence number of the gap is lower than each of a highest sequence number of the first data stream and a highest sequence number of the second data stream before the NAK delay timer has expired; and
 transmit the NAK upon a determination of a first to occur of:
  the user equipment determining that the NAK delay timer has expired and detecting that the gap has not been filled during the delay period; and
  the user equipment determining that each sequence number of the gap is lower than each of the highest sequence number of the first data stream and the highest sequence number of the second data stream before the NAK delay timer has expired.

10. An apparatus for wireless communication, comprising:
means for receiving, by a user equipment, a plurality of data streams that together carry a data transmission, the plurality of data streams including a first data stream from a first cell and a second data stream from a second cell, the first data stream and the second data stream comprising Radio Link Control (RLC) Packet Data Units (PDUs) having respective sequence numbers of the data transmission;
means for detecting, at the user equipment, a gap in the sequence numbers of the RLC PDUs;
means for delaying, at the user equipment, transmitting a not acknowledged (NAK) for the gap in the sequence numbers of the RLC PDUs by starting a NAK delay timer in the user equipment upon detecting the gap;
means for determining, at the user equipment during a delay period after the NAK delay timer has started, whether the NAK delay timer has expired;
means for detecting, at the user equipment during the delay period, whether the gap has been filled;
means for determining, at the user equipment during the delay period, whether each sequence number of the gap is lower than each of a highest sequence number of the first data stream and a highest sequence number of the second data stream before the NAK delay timer has expired; and
means for transmitting, by the user equipment, the NAK upon a determination of a first to occur of:
the user equipment determining that the NAK delay timer has expired and detecting that the gap has not been filled during the delay period; and
the user equipment determining that each sequence number of the gap is lower than each of the highest sequence number of the first data stream and the highest sequence number of the second data stream before the NAK delay timer has expired.

11. An apparatus for wireless communication, comprising:
a processor; and
a memory in electronic communication with the processor, instructions stored in the memory being executable by the processor to;
receive, by a user equipment, a plurality of data streams that together carry a data transmission, the plurality of data streams including a first data stream from a first cell and a second data stream from a second cell, the first data stream and the second data stream comprising Radio Link Control (RLC) Packet Data Units (PDUs) having respective sequence numbers of the data transmission; and
detect, at the user equipment, a gap in the sequence numbers of the RLC PDUs;
delay, at the user equipment, transmitting a not acknowledged (NAK) for the gap in the sequence numbers of the RLC PDUs by starting a NAK delay timer in the user equipment upon detecting the gap;
determine, at the user equipment and during a delay period after the NAK delay timer has started, whether the NAK delay timer has expired;
detect, at the user equipment during the delay period, whether the gap has been filled;
determine, at the user equipment during the delay period, whether each sequence number of the gap is lower than each of a highest sequence number of the first data stream and a highest sequence number of the second data stream before the NAK delay timer has expired, and
transmit the NAK upon a determination of a first to occur of:
the user equipment determining that the NAK delay timer has expired and detecting that the gap has not been filled during the delaying; and
the user equipment determining that the gap is lower than each of the highest sequence number of the first data stream and the highest sequence number of the second data stream before the NAK delay timer has expired.

12. The apparatus of claim 11, wherein the instructions further comprise instructions being executable by the processor to identify whether a selected RLC PDU was transmitted by a first MAC entity of the first cell or a second MAC entity of the second cell.

13. The apparatus of claim 11, wherein the instructions further comprise instructions being executable by the processor to determine a skew duration when the gap in the sequence numbers of the RLC PDUs is subsequently filled, and instructions being executable by the processor to adapt the NAK delay timer in the user equipment to correspond to the skew duration.

* * * * *